United States Patent [19]

Nishibori

[11] Patent Number: 5,977,948
[45] Date of Patent: Nov. 2, 1999

[54] INPUT PROCESSING SYSTEM FOR CHARACTERS

[76] Inventor: Masahiro Nishibori, 8-19 Nishi-Azabu 3-chome Minato-ku, Tokyo, 106, Japan

[21] Appl. No.: 08/801,625

[22] Filed: Feb. 18, 1997

[51] Int. Cl.$^6$ ..................................................... G09G 5/22
[52] U.S. Cl. .......................................... 345/141; 345/353
[58] Field of Search .................................... 345/141, 146, 345/353; 395/110

[56] References Cited

U.S. PATENT DOCUMENTS

| | | | |
|---|---|---|---|
| 4,692,865 | 9/1987 | Hsu | 345/141 |
| 5,227,772 | 7/1993 | Takebe | 340/735 |
| 5,305,433 | 4/1994 | Ohno | 345/141 |
| 5,680,520 | 10/1997 | Watanabe et al. | 395/110 |
| 5,724,526 | 3/1998 | Kunita | 395/277 |

OTHER PUBLICATIONS

Mastering WordPerfect 5.1 & 5.2 for Windows (see figures 10.5, 10.6, pp. 368, 370, lines 10, 11), Jun. 1993.

*Primary Examiner*—Mark K. Zimmerman
*Assistant Examiner*—Ronald Laneau
*Attorney, Agent, or Firm*—Muramatsu & Associates

[57] ABSTRACT

The present invention provides an input processing system which enables input of Chinese characters by kana-kanji conversion (Japanese syllable-Chinese character) or English words, etc. promptly with easy operation. All candidates of characters for input objects are set to a predetermined order and grouped into plural hierarchies, and are stored in a dictionary where a higher hierarchy group consists of each of the top item for one level lower hierarchy. According to an input position defined by an input unit, the lower hierarchy menu is displayed which is selected in the menu item in one level upper menu. The selected character is executed as an input object by pointing the menu item in the hierarchial menu.

10 Claims, 18 Drawing Sheets

FIG. 2A

FIRST TYPE

| LENGTH | CHARACTER/CHARACTERS | POINTER TO THE LOWER HIERARCHY |
|---|---|---|
| LENGTH | CHARACTER/CHARACTERS | POINTER TO THE LOWER HIERARCHY |
| LENGTH | CHARACTER/CHARACTERS | POINTER TO THE LOWER HIERARCHY |
| ⋮ | ⋮ | ⋮ |
| 0 | (END) | |

| LENGTH | CHARACTER/CHARACTERS | POINTER TO THE LOWER HIERARCHY | . . . |
|---|---|---|---|
| LENGTH | CHARACTER/CHARACTERS | POINTER TO THE LOWER HIERARCHY | . . . |
| LENGTH | CHARACTER/CHARACTERS | POINTER TO THE LOWER HIERARCHY | . . . |
| ⋮ | ⋮ | ⋮ | |
| 0 | (END) | | |

FIG. 2B

SECOND TYPE

| LENGTH | DISPLAY CODE | INPUT CODE | POINTER TO THE LOWER HIERARCHY |
|---|---|---|---|
| LENGTH | DISPLAY CODE | INPUT CODE | POINTER TO THE LOWER HIERARCHY |
| LENGTH | DISPLAY CODE | INPUT CODE | POINTER TO THE LOWER HIERARCHY |
| ⋮ | ⋮ | ⋮ | ⋮ |
| 0 | (END) | | |

| 51 | 52 |
|---|---|
| 、  (記号／0102／8141) ▶ | 、  (記号／0102／8141) ▶ |
| 亜  (あ／1601／889F) ▶ | 。  (記号／0103／8142) ▶ |
| 粥  (か／2001／8A9F) ▶ | ◆  (記号／0201／81AF) ▶ |
| 勝  (し／3001／8F9F) ▶ | 0  (英数字／0316／824F) ▶ |
| 函  (は／4001／949F) ▶ | あ  (ひらがな／0401／829F) ▶ |
| 劜  (カ／5002／99A1) ▶ | ア  (カタカナ／0501／8341) ▶ |
| 椿  (木／6001／9E9F) ▶ | A  (ギリシャ／0601／839F) ▶ |
| 鑵  (缶／7001／E39F) ▶ | А  (ロシア／0701／8440) ▶ |
| 陜  (阜／8001／E89F) ▶ | ―  (罫線／0801／849F) ▶ |

INPUT PROCESSING SYSTEM FOR CHARACTERS

FIELD OF THE INVENTION

This invention relates generally to an input processing system for characters in which an input object of characters is selected from candidates of characters on the display unit in the information processing system.

BACKGROUND OF THE INVENTION

There are approximately three kinds of input systems for characters, (1) input by keyboard, (2) input by handwriting, and (3) input by voice.

However, in cases where people who have handicapped arms and/or fingers use a computer system with these input methods, there will be several problems, as outlined below:
Input by Keyboard In the case of input by a keyboard, it is difficult for people who have handicapped arms and/or fingers to press the keys on a keyboard, and substantial training is required to operate the keyboard at a certain level. Moreover, there are limitations in the size of the keyboard due to an alignment of the keys. This is a bottleneck for attempting to produce a small-sized and lightweight input unit.

FIG. 22 is a diagram showing examples of input by a keyboard. To input kanji (Chinese character) using kana-kanji (Japanese syllable-Chinese character) conversion with a keyboard, either kana (using Japanese kana character) keys input or alphabetic keys are generally used.

In FIG. 22A, using kana keys input, converted character "は(ha)" will be displayed when "は(ha)" key is pressed in an "entering kanji by kana character" mode. While using alphabet keys, the converted character "は" will be displayed when the "H" key and "A" key are pressed in an "entering kanji by Romaji (alphabet for spelling out Japanese syllables)" mode.

Next, when a conversion key is pressed, a part of a group of candidate characters for the kana-kanji conversion will be displayed in an item list of a menu, where a cursor will be positioned on the very top menu item of the menu. As shown in FIG. 22B, by pressing the conversion key again, the cursor will move down to the next menu item of the menu.

By repeatedly pressing the conversion key, the cursor moves down to the bottom of the menu and then the rest of the group of candidate characters not previously displayed will be displayed, as shown in FIG. 22C.
Input by Handwriting In the case of input by handwriting, there are problems as follows: An input unit such as a pen must be available; a high level of software technology is needed to recognize the handwriting; and these factors result in a high cost of production.

On the other hand, the accuracy of recognizing handwriting is not yet sufficient. In order to input characters correctly, the users have to write characters accurately, according to each system. For these reasons, it is difficult, especially for handicapped persons, to use these input systems.
Input by Voice Input by voice is rather expensive for general users, due to the high cost of development of voice recognition techniques.

Further, since there is a problem in the accuracy of voice recognition, that type of system would not be practical for use at the present time.

The present invention aims to resolve the problems mentioned above, and to provide an inexpensive input processing means of characters that enables a user to input characters into information processing units, such as computers, with easy operation, even for people physically handicapped in their arms and/or fingers.

SUMMARY OF THE INVENTION

The present invention enables a user to input kanji (Chinese character), kana-moji (Japanese character), alphabets and words by these characters, with easy and quick operation. It provides a dictionary which all candidates of characters for input objects are arranged in a predetermined order and grouped into plural hierarchies and are stored in the dictionary where a higher hierarchy group consists of each of the top item for one level lower hierarchy.

A menu display processing means displays a hierarchical menu for inputting a character or characters. That is, according to the position of the cursor in the menu displayed on the display unit, the menu display processing means displays, one after another, the lower hierarchy menu wherein the cursor-pointed item is listed as the top item. A character selection processing means provides a character or characters which are selected in the menu as an input object towards the information processing system.

According to the present invention, it is possible to carry out input processing of kanji or other characters in compliance with various languages by using only an input means which moves a cursor on the display by a mouse, and this enables the user to carry out input processing with simple actions, even for handicapped or aged people or children.

Because a keyboard is unnecessary in this invention, a small-sized and lightweight input unit can be realized. Moreover, there is no need of any special hardware for achieving the invention, and installation of the invention can easily be accomplished. These factors result in the inexpensive system of the present invention. It is also easy to customize the dictionary data according to the user's necessity.

The invention will become more readily apparent from the following description of the preferred embodiments thereof, as shown in the accompanying drawings.

BRIEF DESCRIPTION OF THE DRAWINGS

FIG. 2 is a diagram showing an example of the data structure of the present invention.

FIG. 18 is a diagram showing a display example of the menu in the first hierarchy.

FIG. 19 is a diagram showing a display example of the menu in the first and the second hierarchies.

FIG. 21 is a diagram showing a display example of the menu in the first through the fourth hierarchies.

DETAILED DESCRIPTION OF THE PREFERRED EMBODIMENT

Figure 1:
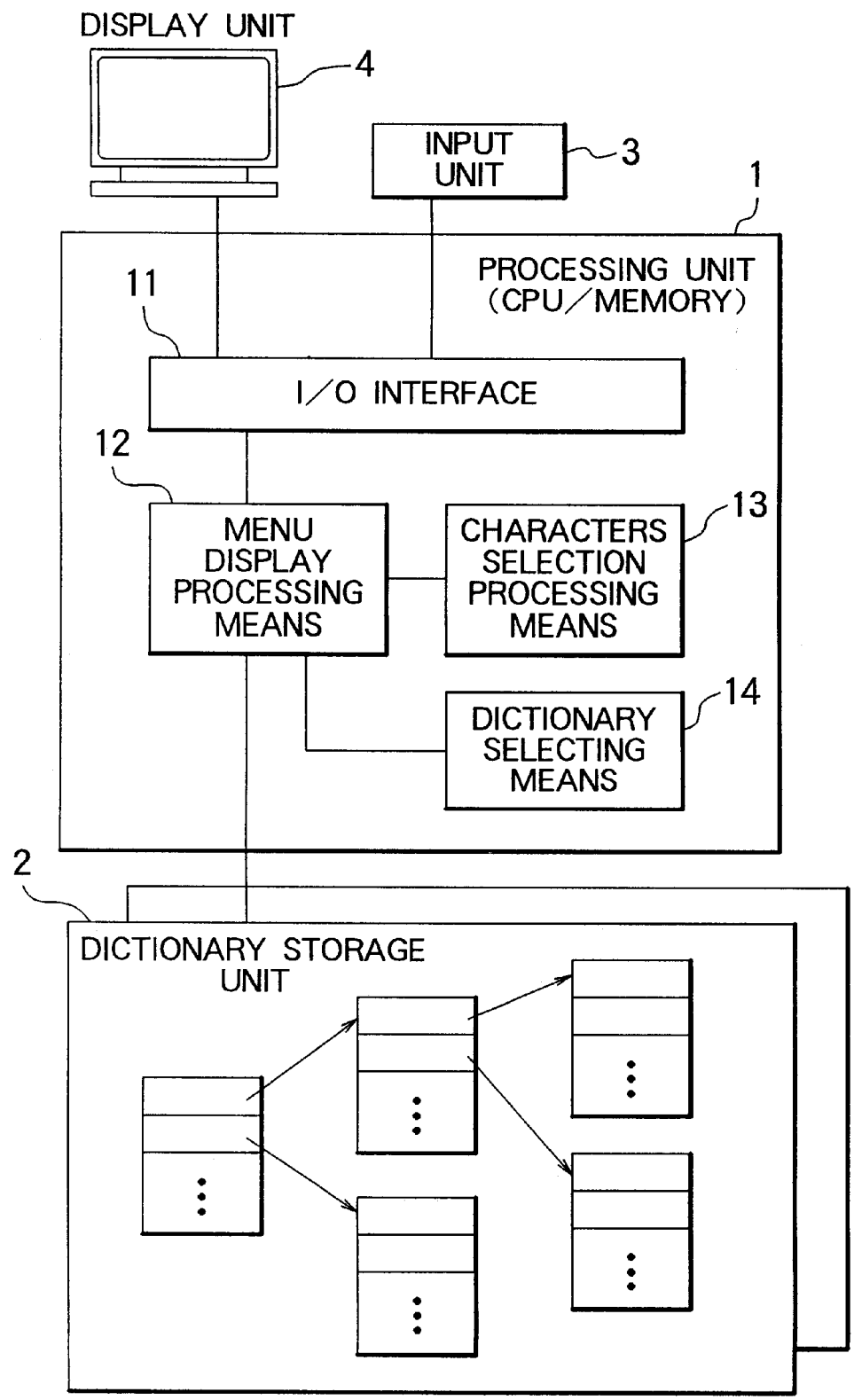
FIG. 1 is a diagram showing an example of the configuration of the present invention.

In order to resolve the problems in the conventional system mentioned above, the present invention is comprised of the following means. As shown in FIG. 1, a processing unit having CPU and memory, etc., is identified by the reference numeral 1; a dictionary storage unit is identified by the reference numeral 2; an input unit, such as a mouse or button unit, is identified by the reference numeral 3; a display unit is identified by the reference numeral 4; an I/O interface is identified by the reference numeral 11; a menu display processing means is identified by the reference numeral 12; the character selection processing means is identified by the reference numeral 13; and a dictionary selecting means is identified by the reference numeral 14.

The I/O interface 11 is an interface which receives and transmits I/O signals within the processing unit 1 and the input unit 2 or the display menus, which consist of menu items of characters belonging to each hierarchical group, in a hierarchical order from the top menu. It is possible to give a function of automatically displaying a menu consisting of an item list of characters to the menu display processing means 12.

The character selection processing means 13 selects one character from the item list of the menu displayed by the menu display processing means 12 and sends this character as an object of input processing to a means which demands to input, such as application programs, etc. (not shown in FIG. 1).

Further, the menu display processing means 12 and the character selection processing means 13 are respectively organized to display the menu or to input the characters in accordance with the same processing algorithm which may correspond to plural and different kinds of dictionary storage unit 2. The dictionary selecting means 14 is a processing means to select or exchange one of the plural dictionaries by inputting such as file names from the input unit 3 to specify a dictionary.

The dictionary storage unit 2 is a means to store candidate characters for conversion grouped into plural hierarchies and arranged in a certain order, and information on the upper hierarchy group consisting of all the top characters of lower hierarchy groups.

The dictionary storage unit 2 has a certain data structure which does not depend on whichever kind of character is stored as a candidate for conversion.

Hereafter, a function of the present invention is described. First of all, in the present invention, when input processing is started with an indication from the input unit 3, the menu display processing means 12 displays a menu that shows the item list of candidates of characters in the very top level of the hierarchy based on the information already stored in the dictionary storage unit 2, on the display unit 4.

If an intended character for input is in the top hierarchy menu, the user places the cursor on the menu item and selects the item by using the input unit 3. The character selection processing means 13 selects the cursor-pointed character in the menu as the character for input.

On the other hand, if the intended character for input is not found in the top hierarchy menu, followed by passing the cursor through the menu items, each submenu associated to each menu item will be displayed on the side of the top hierarchy menu on the screen of the display unit 4; a group of candidate characters displayed as items of the submenu belong to the group one level lower in the hierarchy. By the menu display processing means 12, according to the cursor movement, similar operations will be carried out for pointing the cursor to the suitable menu item.

The above-mentioned operation is continued repeatedly for each hierarchy until the intended character appears on the menu. When the intended character is found, the input processing will be done by undertaking the operation for selection.

By doing this, it is possible to select the intended characters from the numerous candidates of characters and input necessary characters promptly by less operation procedures.

The data structure of the dictionary which is stored in the dictionary storage unit 2 is provided in advance with certain forms and in several types, so that each user may customize the data form of the dictionary optionally according to the type of data structure of the dictionary.

Also, the present invention enables the selection or change in the dictionary storage unit 2 by using the dictionary selection means 14 according to the system in which this invention is implemented, which makes it easy to carry out input processing of not only Japanese, but also western languages or symbols, etc., by using the same operation process.

Particularly for inputting Japanese, it is unnecessary to carry out the operation for kana kanji conversion. Also, as for inputting comparatively long characters such as geographical names, it is possible to input such characters with the same operation procedures as inputting only one character.

Further, certain figure marks or symbols, etc., may be included in the characters for which the present invention aims to input.

Hereafter, the preferred embodiments of the present invention are explained as follows, with reference to the accompanying drawings. FIG. 2 shows an example of data structures of the dictionary of the present invention.

FIG. 2(A) shows a first type of data structure of the dictionary including the length of each of the candidate characters, the candidate characters, a pointer which points out the lower hierarchy having a certain candidate character which is in their level on the upper hierarchy group, as the top menu item of the menu. When the value of the length is "zero," it means an end of data.

FIG. 2(B) shows the data structure of a dictionary of a second type, and it includes the length of each character, display codes of characters, input codes of character or characters in the one level upper menu. This second type of dictionary data is used when a character is displayed in the menu on the display screen that is different from the actual code of characters for input. As for this type, it is possible to use it in such a way as inputting characters by using symbols or figures, inputting Japanese characters with English words, or inputting English word with Japanese characters.

When the length of characters is fixed, data showing the character length may be omitted from the data structure of the dictionary.

Figure 3:
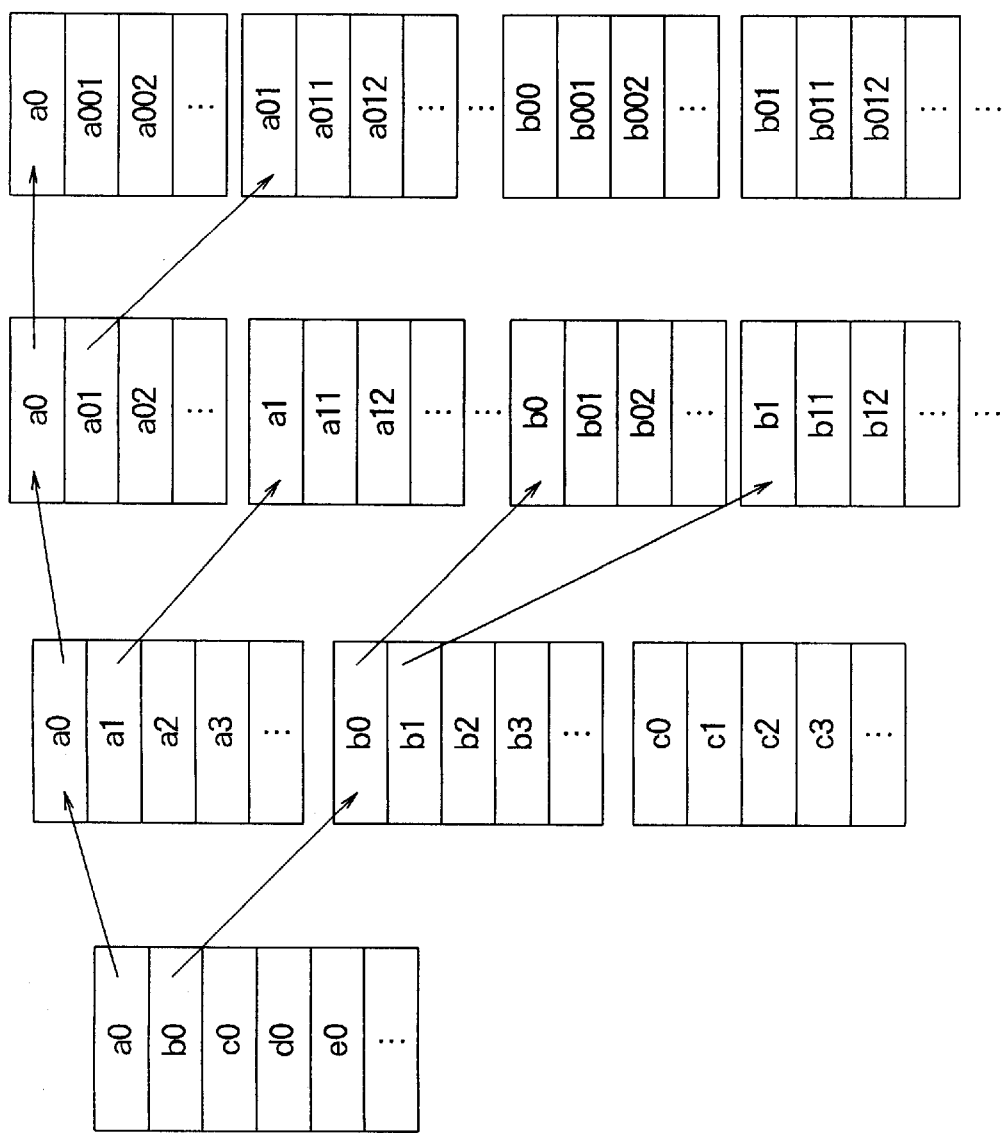
FIG. 3 is a diagram showing an example of the hierarchy structure of the dictionary data.

FIG. 3 is an example of configuration of layered structure of data for dictionary. For example, when the characters displayed in the menu of the very top (the first) hierarchy is a0, b0, c0, d0, e0 . . . , character a0 in the top (the first) menu will link to the one level lower (the second) hierarchy which consists of candidate characters a0, a1, a2, a3 . . . , and the candidate a0 is positioned at the top of the menu. This group of candidate characters a0, a1, a2, a3 . . . will be displayed as a second tier menu of the top hierarchy menu.

Further, the candidate a0 which is in the second hierarchy group will be linked to the third hierarchy group consists of candidates a0, a01, a02; these groups of characters will be displayed as a menu item for one level lower (the third) hierarchy.

In the same way, the candidate al will be linked to a character group a1, a11, a12 . . . and the characters in the group will be redisplayed as a menu item for its one level lower (the fourth) hierarchy of characters.

The process of inputting the character of Chinese character, "gikei (義兄)" in the first embodiment will be explained hereafter. The input is performed by a mouse in the first embodiment, and when the menu item in the displayed menu is clicked, one level lower hierarchy menu having that selected item as its top menu item is displayed. When the menu item is double-clicked, it means that the characters in that item are selected as an object for the input.

Figure 4:
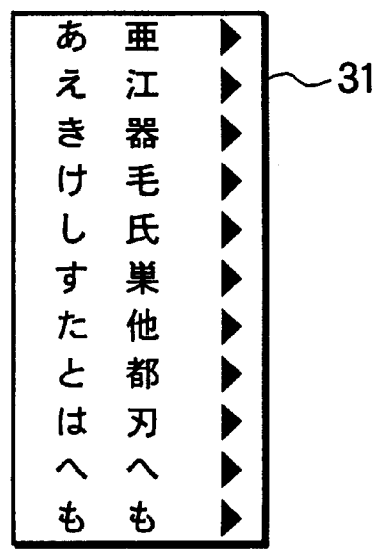
FIG. 4 is a diagram showing a display example of the menu in the first hierarchy.

FIG. 4 shows an example of the top (the first) hierarchy menu 31 of the present invention.

Figure 5:
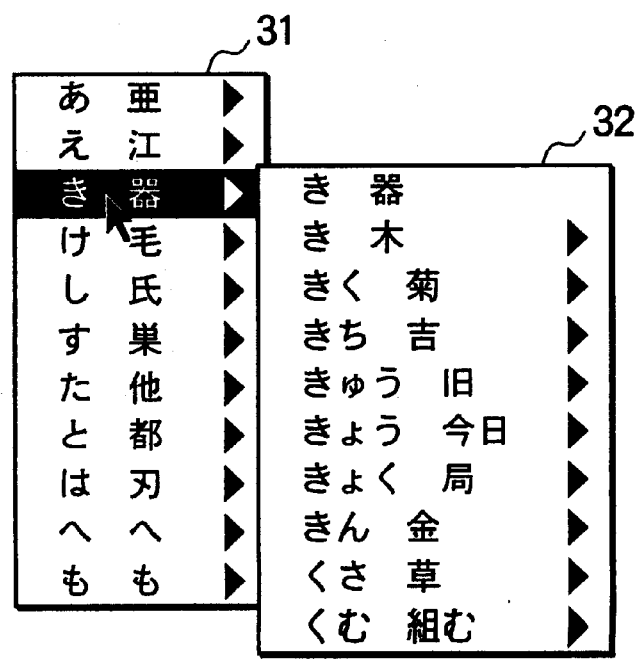
FIG. 5 is a diagram showing a display example of the menu in the first and the second hierarchies.
Figure 6:
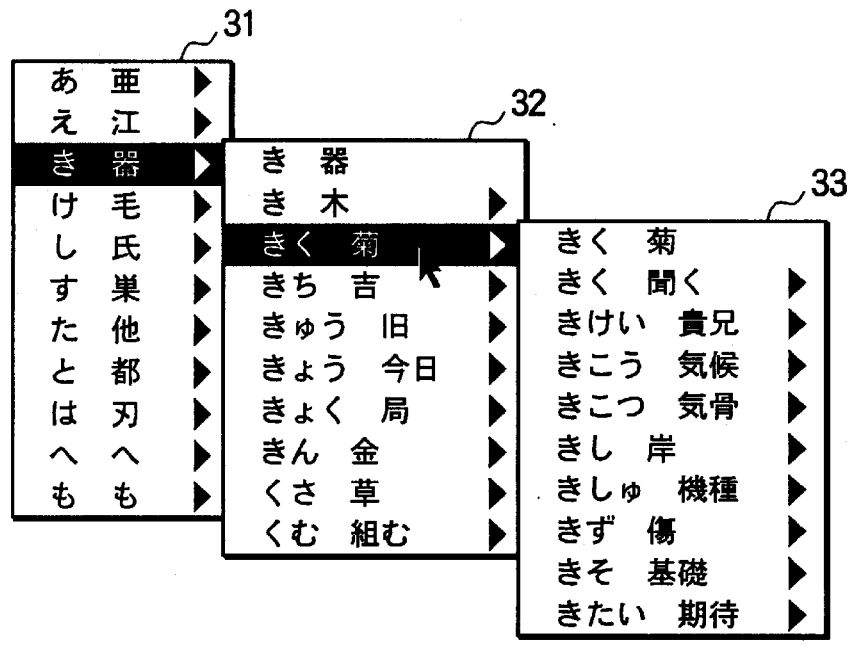
FIG. 6 is a diagram showing a display example of the menu in the first through the third hierarchies.

From the items in the first hierarchy menu 31, by pointing the cursor to an item "Ki (器)" which considered to be including pronunciation "gikei," and "Ki (器)" will be displayed in a reverse contrast image, as this hierarchy structure is based on Japanese syllabary order which corresponds to an alphabetical order. By clicking this item with the mouse, the second hierarchy menu 32 which is one level lower hierarchy of the item "Ki (器)" will be displayed. FIG. 5 shows the situation of this procedure wherein "Ki (器)" in the first menu 31 is displayed in the reverse contrast, and the second hierarchy menu 32 which is one level lower hierarchy of "Ki (器)" is displayed simultaneously.

Since "gikei" is not in the items displayed in the second hierarchy menu 32, as a next step, the cursor is placed on an item "Kiku (菊)" which considered to be the hierarchy group that would include "gikeil " and is clicked. Consequently, the third hierarchy menu 33 that is one level lower hierarchy menu which has the item "Kiku (菊)" as a top character is now displayed.

Figure 7:
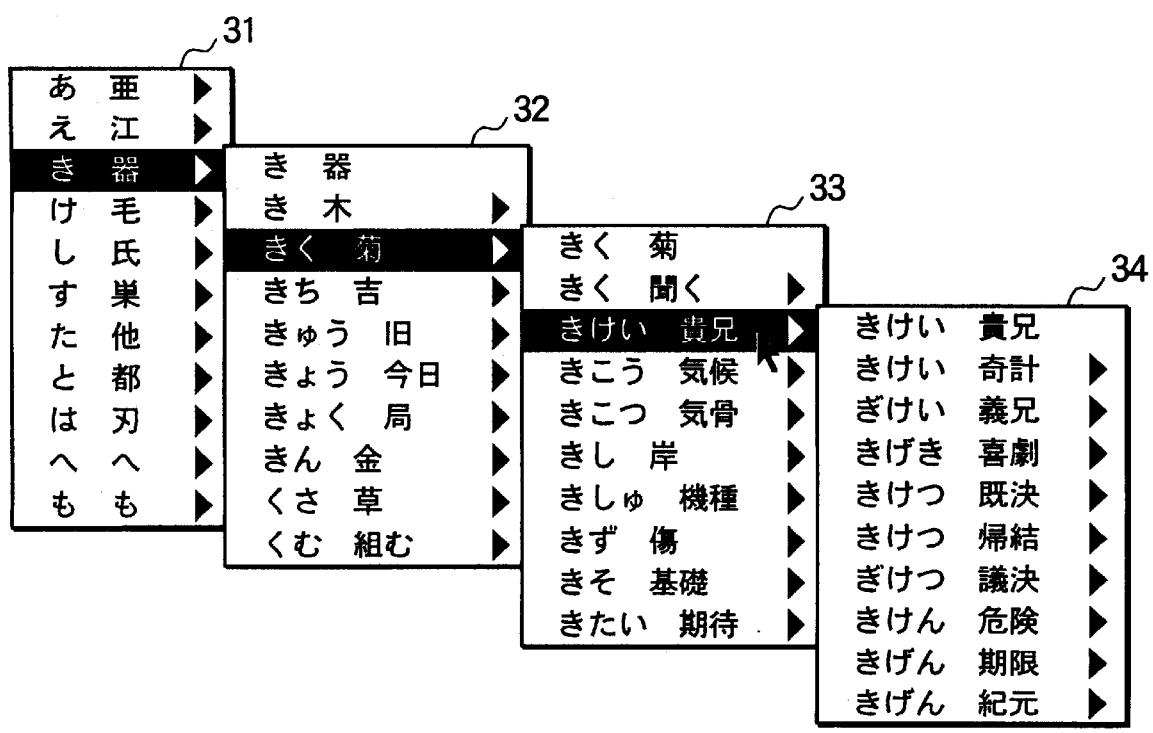
FIG. 7 is a diagram showing a display example of the menu in the first through the fourth hierarchies.
Figure 8:
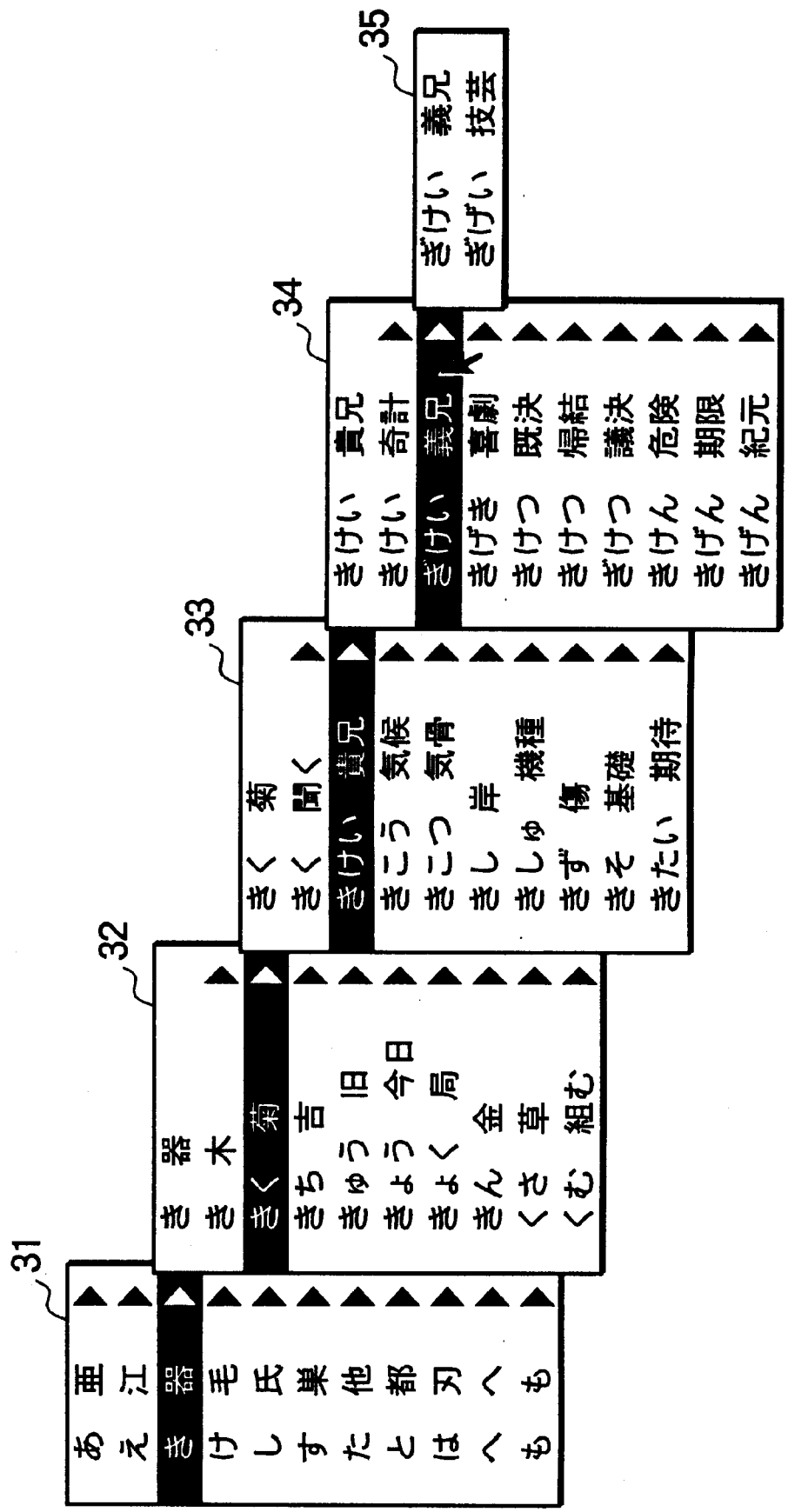
FIG. 8 is a diagram showing a display example of the menu in the first through the fifth hierarchies.

In the same way, by clicking "kikei (貴兄)" in the third hierarchy menu 33, the fourth hierarchy menu 34 will be displayed as shown in FIG. 7. Finally, to point out an item "gikei (義兄)" which is found in the item of the fourth hierarchy menu 34 with the cursor and double-click the item; the input processing of "gikei" as a character for input is completed.

Figure 9:
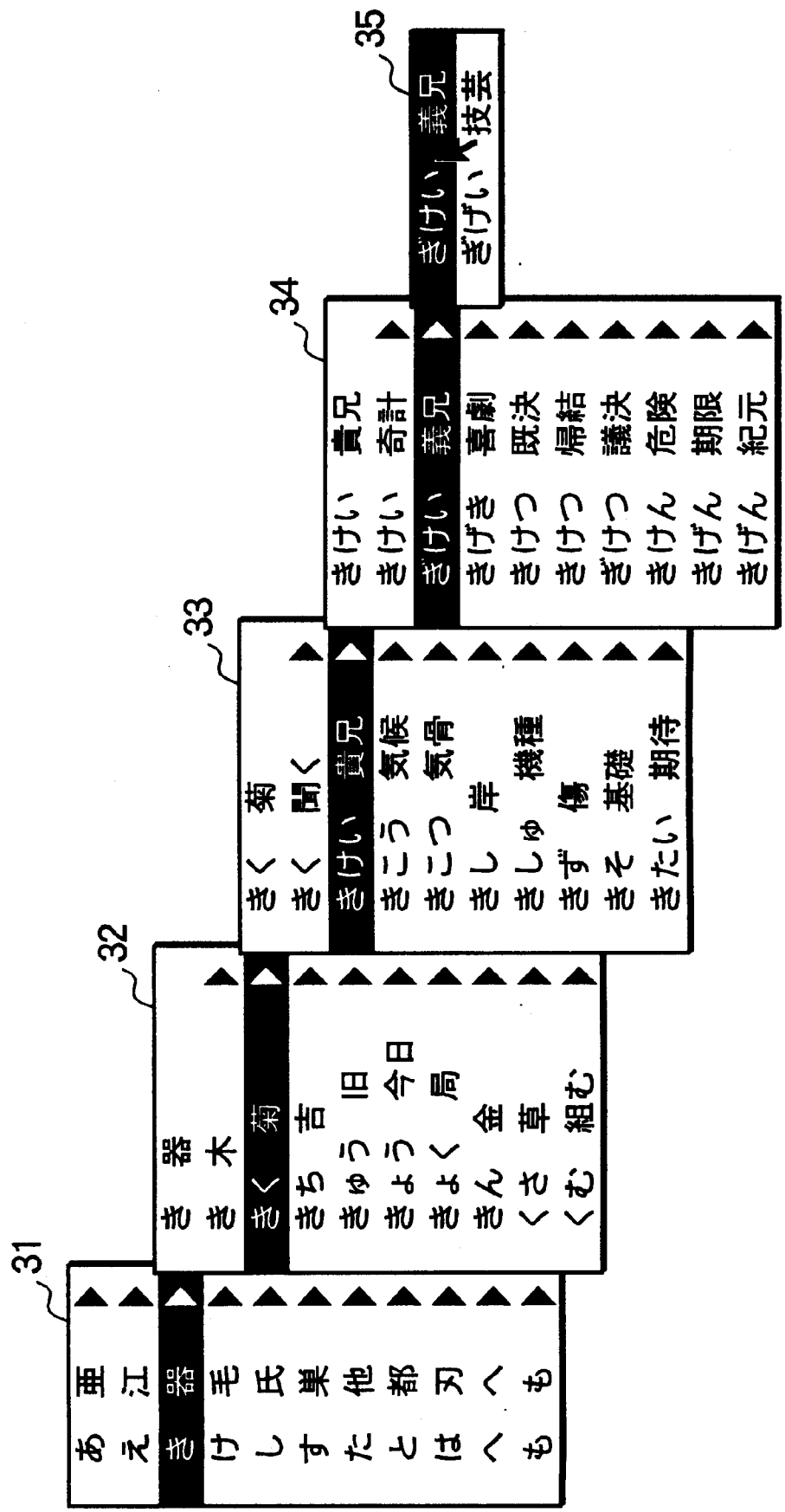
FIG. 9 is a diagram showing a display example of the menu in the first through the fifth hierarchies.

Moreover, if the cursor is simply clicked the item "gikei (義兄)" in the fourth hierarchy menu 34, the fifth hierarchy menu 35 will be displayed as shown in FIG. 9. By double-clicking "gikei (義兄)" in the fifth hierarchy menu 35, it is also possible to select and input "gikei" as the character for input.

Figure 10:
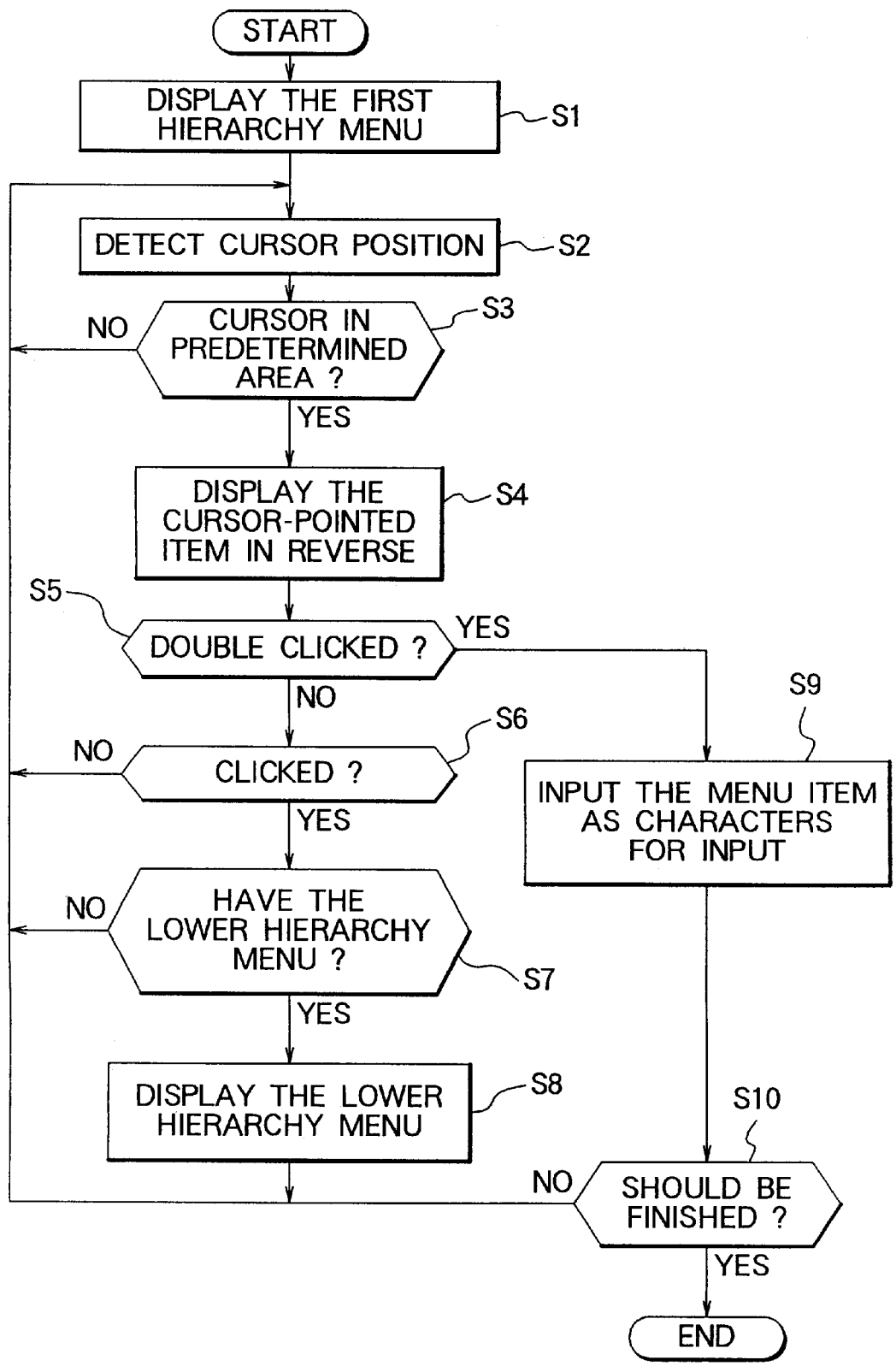
FIG. 10 is a flow chart showing the processing in the first embodiment of the present invention.

FIG. 10 is a flow chart of process in the first embodiment of the present invention.

In the step S1, by making indication of input, the input processing system reads the characters which belong to the first hierarchy menu in the dictionary storage unit 2, and display the first hierarchy menu.

In the step S2, the position of the cursor is detected. In the step S3, it is determined whether the cursor is within an effective range of designation. An effective range of designation is a predetermined input range which includes the circumference parts of the menu on the display screen. If the cursor is within the effective range of designation, the process of step 4 is carried out and, if not, the operation flow is returned to the step S2 or the menu of hierarchy which is displayed is closed.

In the step S4, the character positioned by the cursor is displayed in a reverse contrast image during which the cursor is remained in that position. Next, in the step S5, a decision is made as to whether the cursor has been double-clicked or not. If double-clicked, the process goes to the step S9 and, if not, the process goes to the step S6.

In the step S6, it is determined whether the cursor has been clicked or not. If being clicked, the process goes to the step S7, and, if not, the process returns to the step S2.

In the step S7, a decision is made as to whether the character has its lower hierarchy menu. If the character has the lower hierarchy menu, the process goes to the step S8 and if it does not have the lower hierarchy menu, the process returns to the step S2.

In the step S8, the menu of one level lower hierarchy for the clicked characters will be displayed, and the process returns to the step S2 and repeats the above procedures in the same way.

In the step S9, input processing is performed for the character which is double-clicked in the step S5. In the step S10, decision is made as to whether the process should be finished or not, and if not, the process returns to the step S2.

Hereafter, the second embodiment is explained with an example of process for inputting an English word "seeing" with reference to FIGS. 11–16.

In the second embodiment, when pressing the mouse button in an effective range of designation, the menu will be displayed, and by releasing the mouse button, the character located where the cursor is positioned in the menu will be processed for input.

When the cursor flows out from the effective range of designation, the menu displayed will be released. Thus, a necessary character can be selected and inputted easily by moving the cursor in the pressing condition of the mouse button, and releasing the button in a suitable position.

Displaying a menu for each hierarchy will be undertaken automatically according to the cursor position. That is to say, within the menu of the first hierarchy, when the cursor is moved in the pressing condition of the mouse button, the menu item where the cursor is positioned will be displayed automatically, for example in a reverse contrast image, and the second hierarchy menu which is linked with the selected menu item will be automatically displayed on the side of the first hierarchy menu.

To move the cursor to the second hierarchy menu, the cursor is easily moved to the second hierarchy while pressing the mouse button. In the same way, as moving the cursor in the second hierarchy menu, the menu item where the cursor is located will be displayed in the reverse contrast one after another followed by the cursor movement. At the same time, the third hierarchy menu which is a subordinate of the menu item where cursor is positioned will be displayed one after another.

By releasing the mouse button on the intended menu item, input processing will be done for the characters in the designated menu item.

Figure 11:
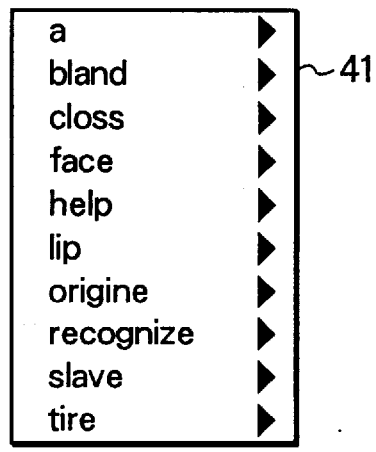
FIG. 11 is a diagram showing a display example of the menu in the first hierarchy.

FIG. 11 is a diagram for explaining an example of input processing by the second embodiment. FIG. 11 shows an example of the first hierarchy menu 41 which is in the very top hierarchy.

Since English words are put into an alphabetical order, it is obvious that an aimed word "seeing" is included in the menu item, "recognize" in the first hierarchy menu 41.

Figure 12:
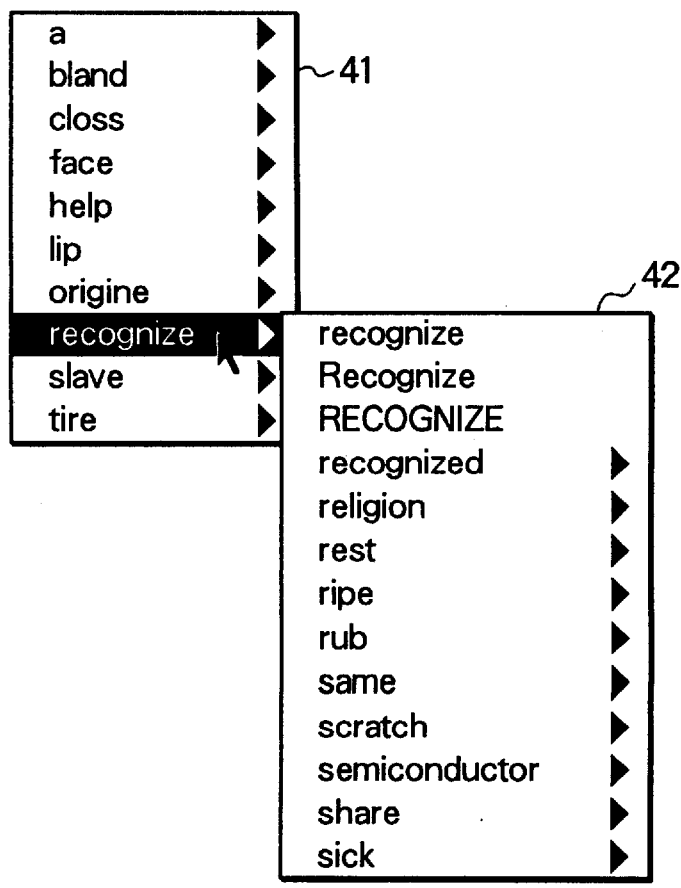
FIG. 12 is a diagram showing a display example of the menu in the first and the second hierarchies.

Therefore, the cursor is shifted while pressing the mouse button until the cursor is positioned on the menu item "recognize." When the menu item "recognize" is pointed by the cursor, a second hierarchy menu 42 which is the one level lower hierarchy will be displayed automatically as shown in FIG. 12.

Figure 13:
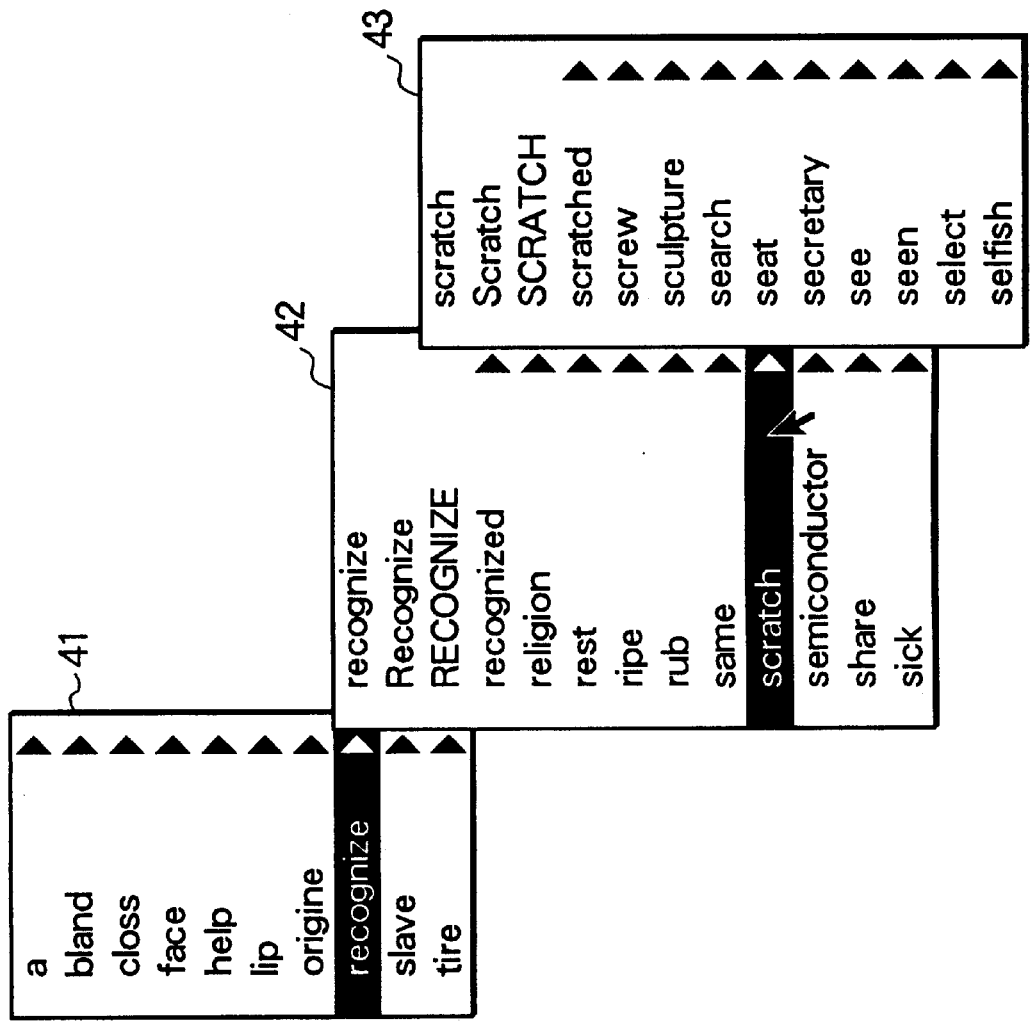
FIG. 13 is a diagram showing a display example of the menu in the first through the third hierarchies.
Figure 14:
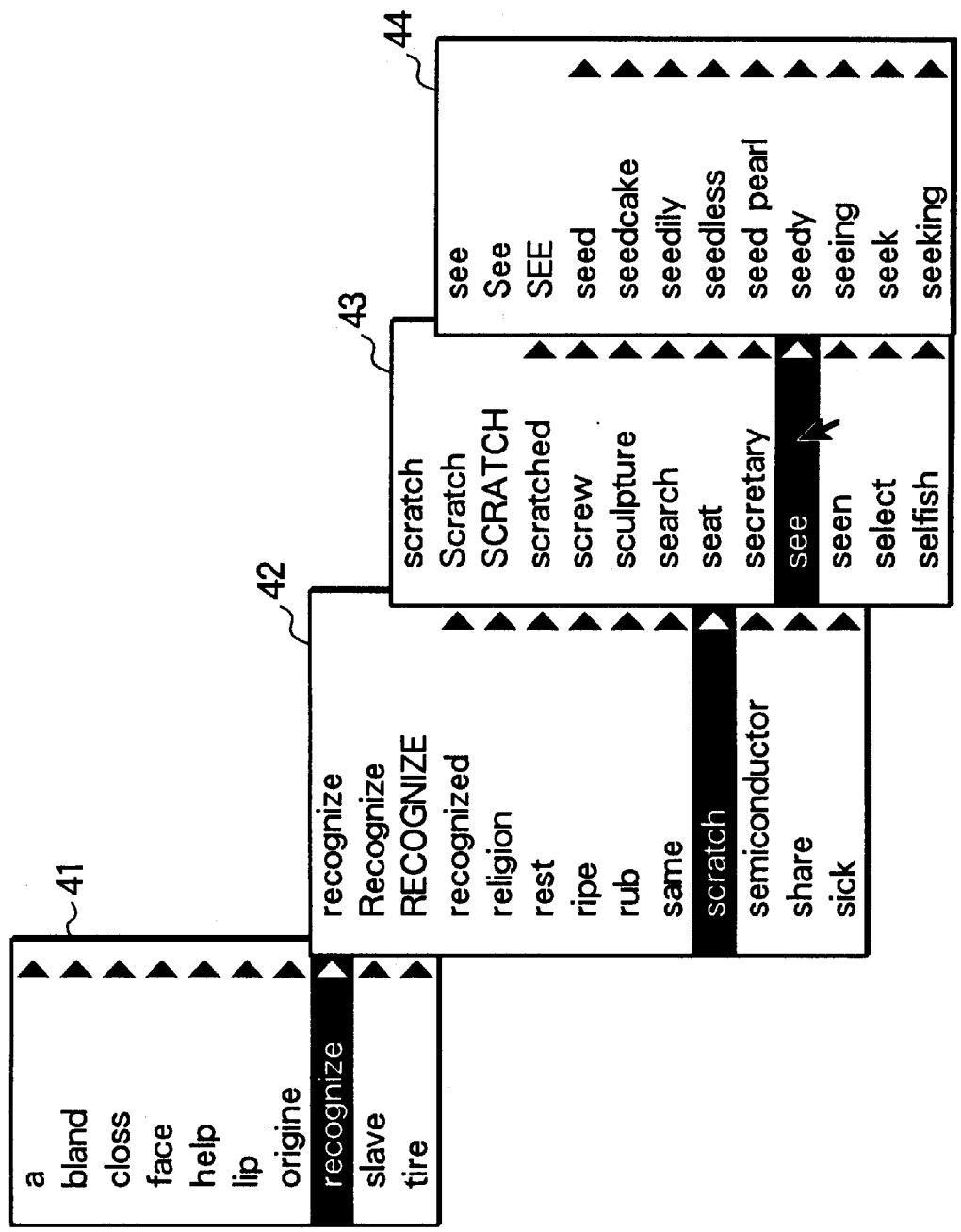
FIG. 14 is a diagram showing a display example of the menu in the first through the fourth hierarchies.

Further, the cursor is moved to the second hierarchy menu 42 while pressing the mouse. In the second hierarchy menu 42, with the mouse in the pressed condition, the cursor is shifted to the position of a menu item "scratch." Then, as shown in FIG. 13, the third hierarchy menu 43 will be displayed. In the same way, by moving the cursor to the menu item "see" in the third hierarchy menu 43, the fourth hierarchy menu 44 will be displayed as shown in FIG. 14.

Figure 15:
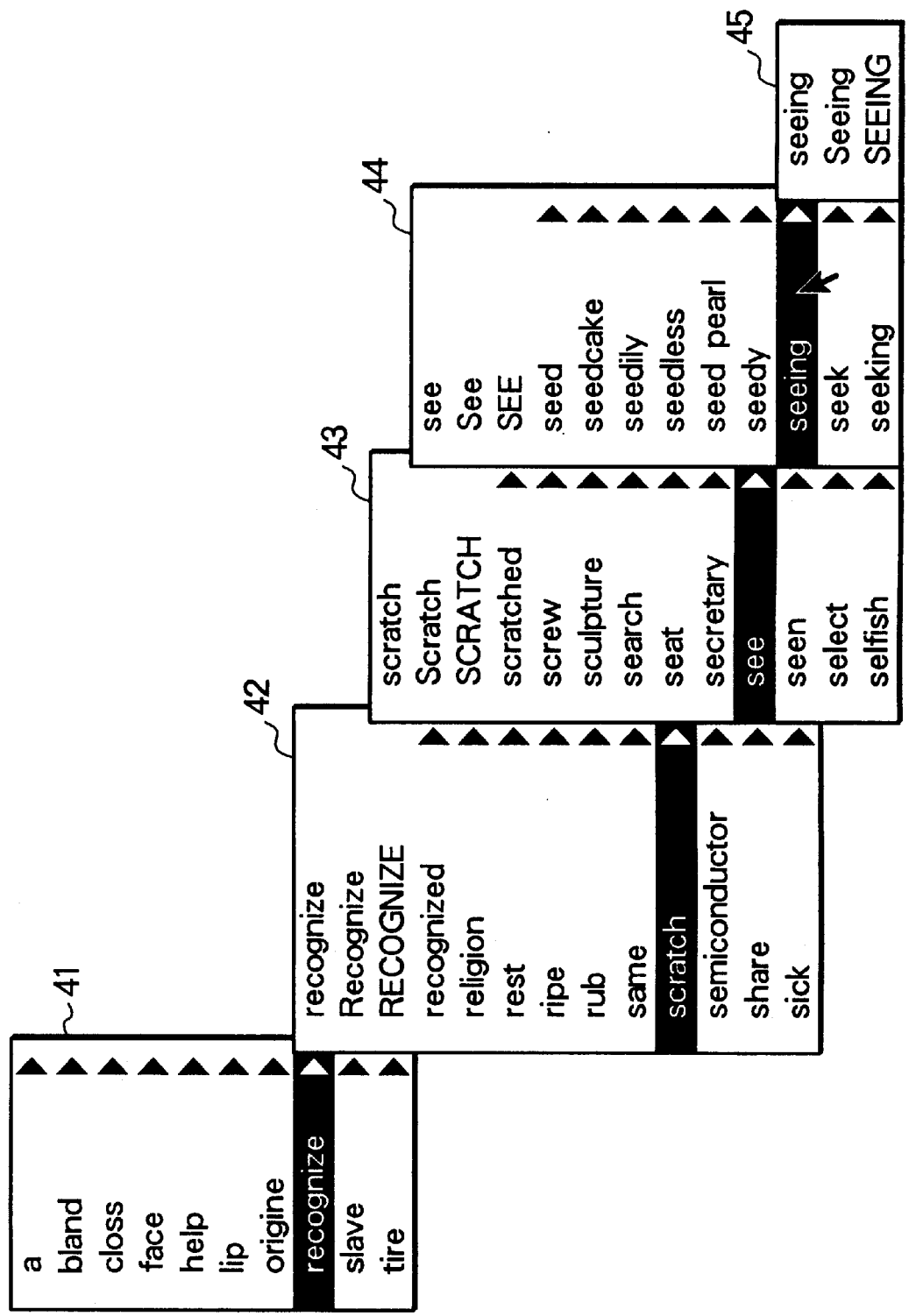
FIG. 15 is a diagram showing a display example of the menu in the first through the fifth hierarchies.
Figure 16:
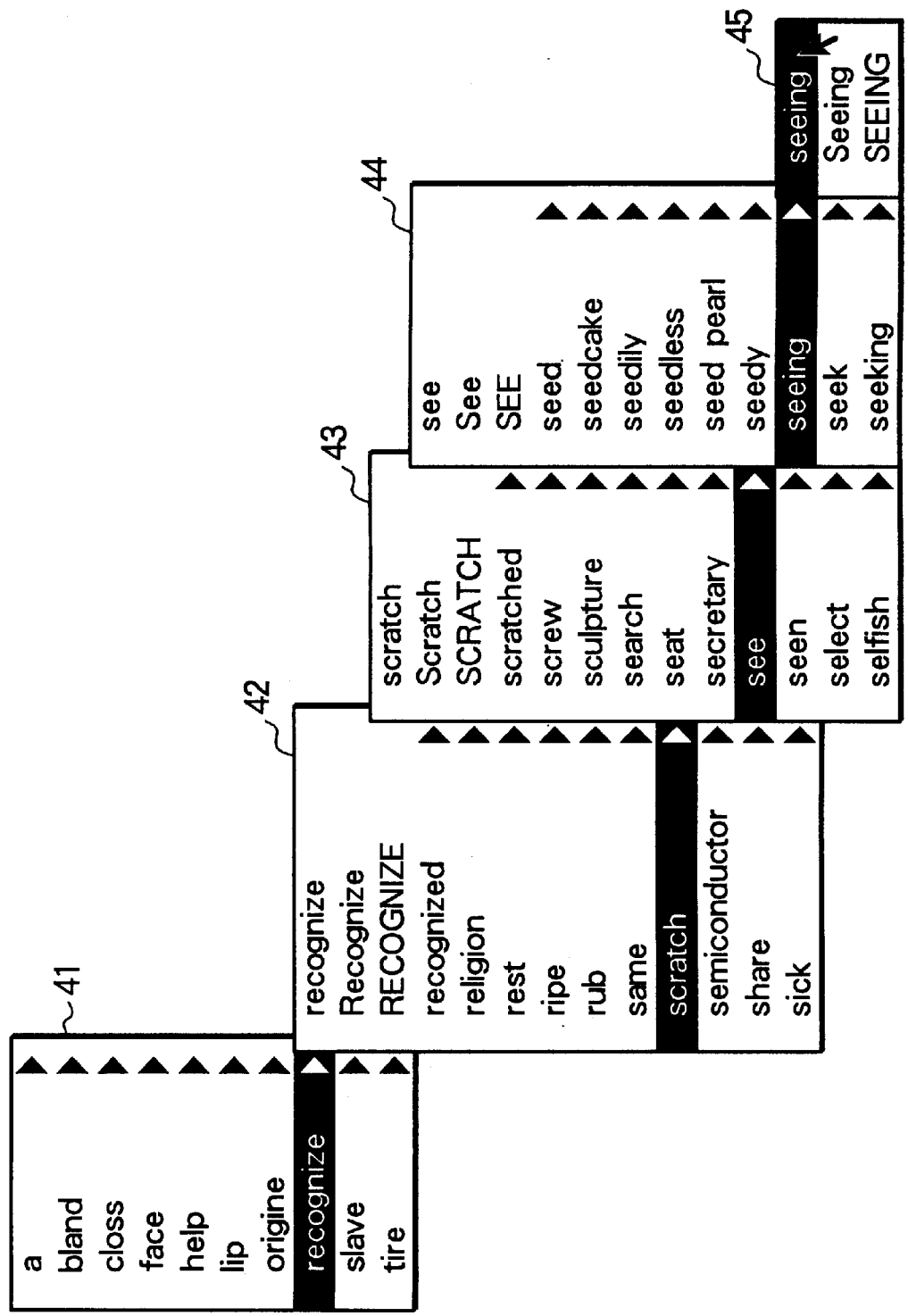
FIG. 16 is a diagram showing a display example of the menu in the first through the fifth hierarchies.

FIG. 15 shows the situation in which the cursor points out the word "seeing" in the fourth hierarchy menu 44. Here, if the mouse button is released, the menu item "seeing" which the cursor is now positioned will be considered to be the character for input. Besides, if the cursor is moved to the fifth hierarchy menu 45 and released at the positioned of the menu item "seeing," input processing of "seeing" can also be executed. In the fifth hierarchy menu 45, "Seeing (first letter capitalized)" or "SEEING (whole word capitalized)" can also be selected for input.

When the cursor is moved from the lower hierarchy menu to the higher hierarchy menu, the lowest hierarchy menu which is displayed may be closed.

If no input processing of character is to be made, by moving the cursor away from all the menus and releasing the mouse button, the whole menus will be closed and input processing will end.

Figure 17:
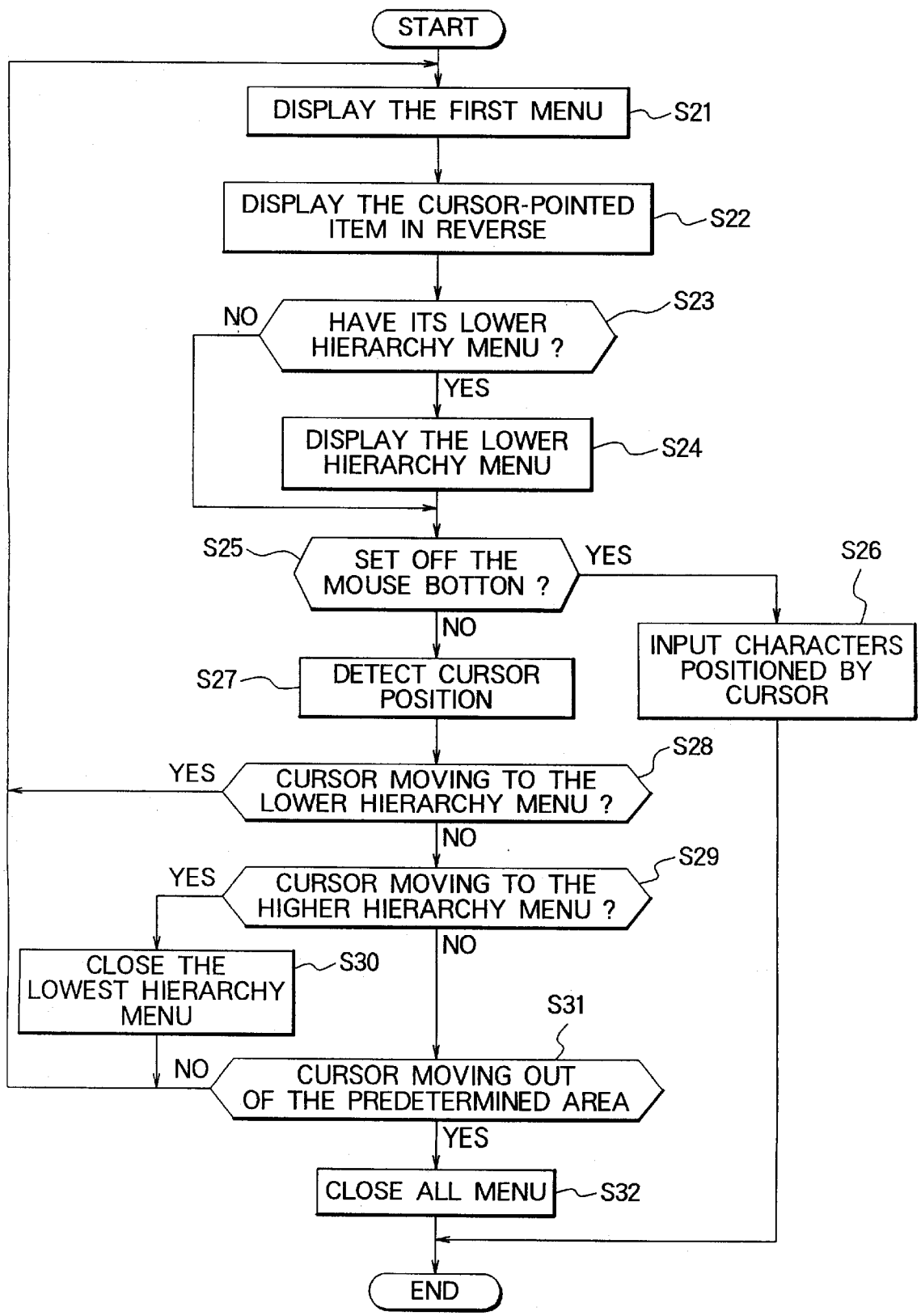
FIG. 17 is a flow chart showing the processing in the second embodiment of the present invention.

FIG. 17 is a flow chart showing the process of the second embodiment of the present invention. In the step S21, the first hierarchy menu will be displayed. In the step S22, the menu item where cursor is positioned will be displayed in the reverse contrast.

In the step S23, it is determined whether the menu item where cursor is positioned has the lower hierarchy menu. If the menu has the lower hierarchy menu, process goes to the step S24, and if the lower menu item does not exist, the process goes to the step S25.

In the step S24, the lower hierarchy menu will be displayed. Here, if some of the menus are regarded unnecessary, they can be erased by moving the cursor accordingly.

In the step S25, a decision is made as to whether the mouse button is turned OFF or not. If the mouse button is turned OFF, the process goes to the step S26 wherein the characters of the menu item where the cursor is now positioned is notified to the input system as the input character, then the process ends.

If the mouse button remains OFF, the cursor position will be detected in the step S27. In the step S28, it is determined whether the cursor has moved to a lower hierarchy menu or not, if moved to a lower hierarchy menu, the process goes back to the steps S21 and performs the procedures in the steps S22–S28 in the same way mentioned above.

When the cursor has not moved to a lower hierarchy menu, a decision is made in the step S29 as to whether the cursor moved to a higher hierarchy menu or not. If the cursor has moved to a higher hierarchy menu, the lowest hierarchy menu which is unnecessary will be closed by the step S30. After this procedure, the process returns to the step S22.

If the cursor is out of an effective range of designation, the whole menu will be closed by the step S32 and the input process ends.

FIGS. 18 to 21 are diagrams of the third embodiment of the present invention explaining the process of inputting a character (or signals of) ".". Characters in the menu are divided into several groups based on a JIS (Japan Industrial Standard) code order.

Figures 18, 19:
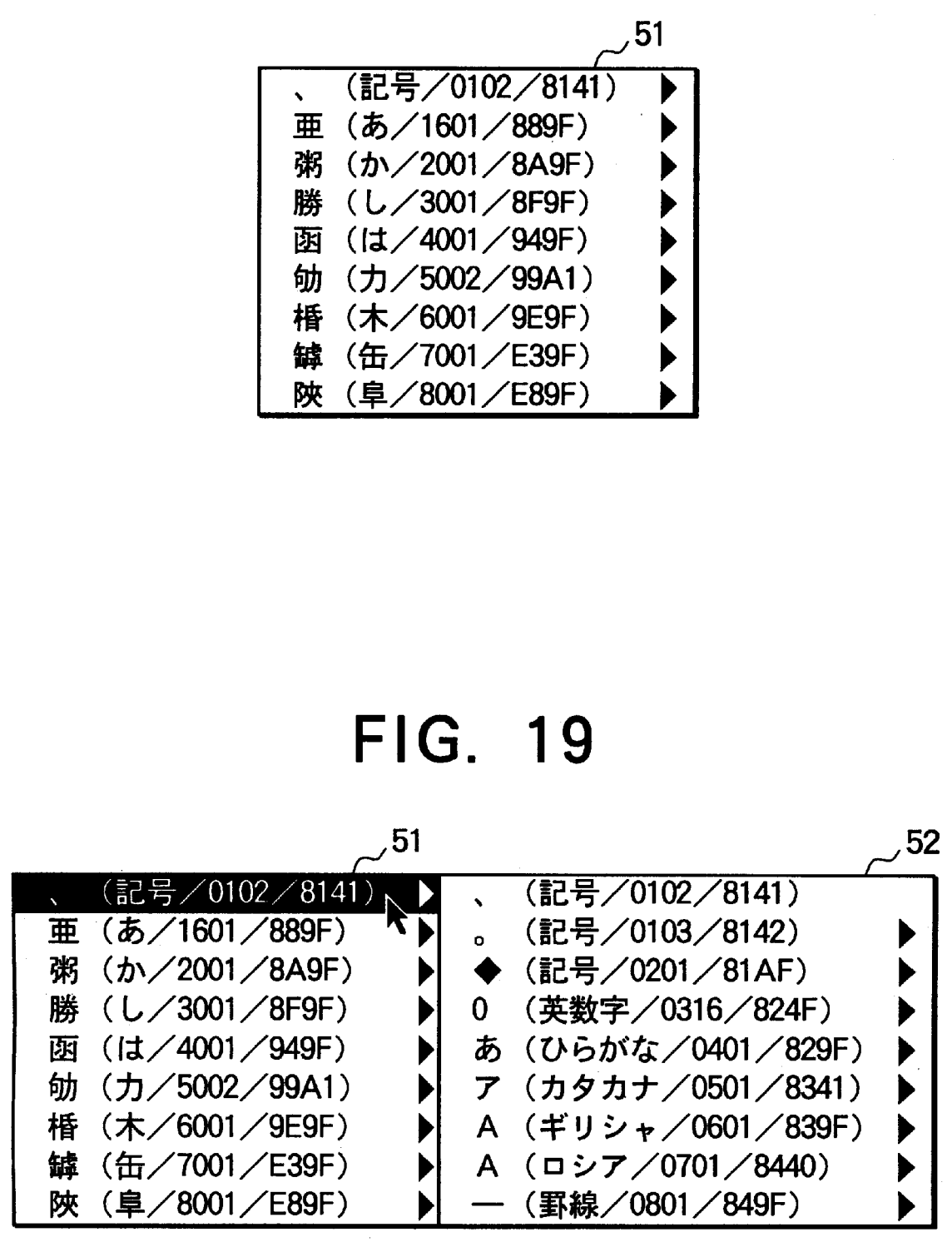

FIG. 18 shows an example of first hierarchy menu. In each of the menu item, in addition to the character, it is also provided with a group name, a character code, and a shift JIS code. This additional information is useful in selecting the characters.

If the right character for input is found in the displayed menu items, that item is selected by the cursor. If the character is not found in the menu, the lower hierarchy menu is displayed by pointing the cursor to the menu item which would include the character for input by operating the mouse.

FIG. 19 shows a situation where the cursor is pointing at the item "," in a first hierarchy menu 51. By this condition, a second hierarchy menu 52, which is in the JIS code order starting from the item "," in the top is displayed. If there is an aimed character for input, then that character is selected. If there is no aimed character, the cursor is shifted to the menu item which has its lower hierarchy menu where aimed character would be included by the mouse operation. As a result, the lower hierarchy menu of the selected menu item is displayed.

Figure 20:
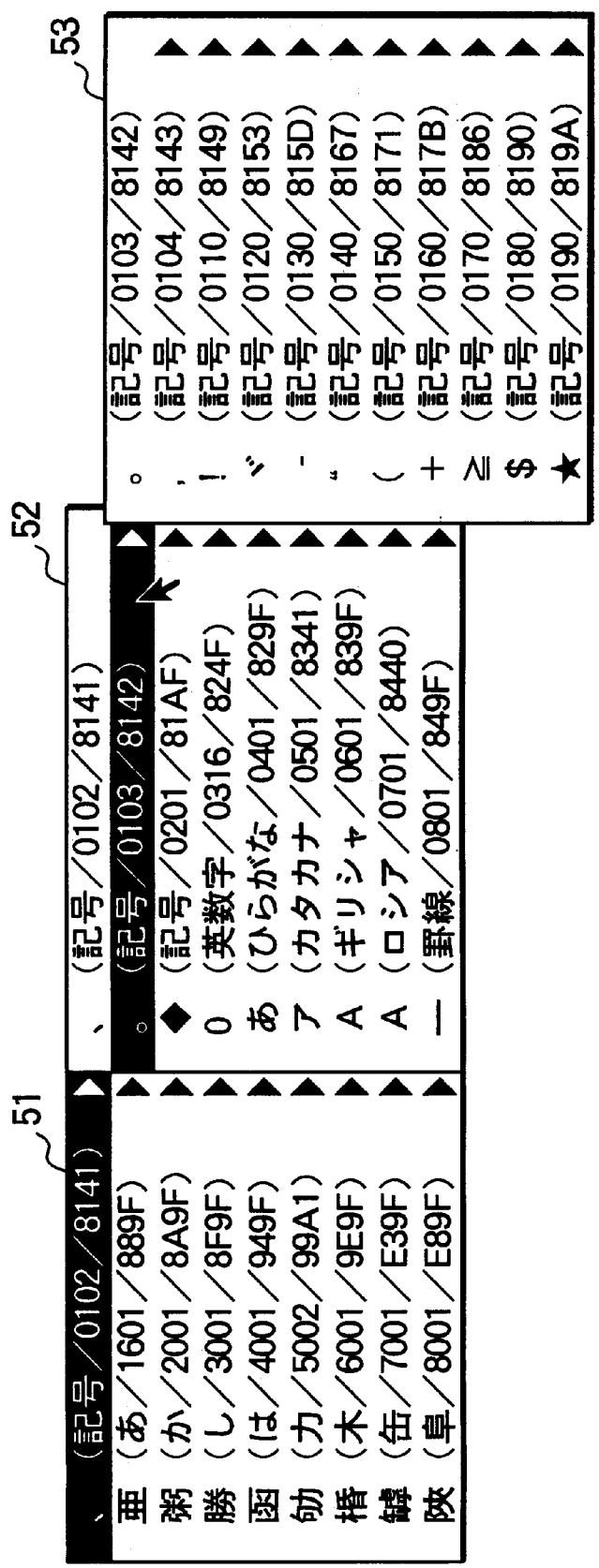
FIG. 20 is a diagram showing a display example of the menu in the first through the third hierarchies.
Figure 22A:
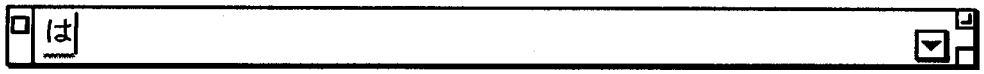
FIG. 22 is a diagram explaining the prior art.
Figure 22B:
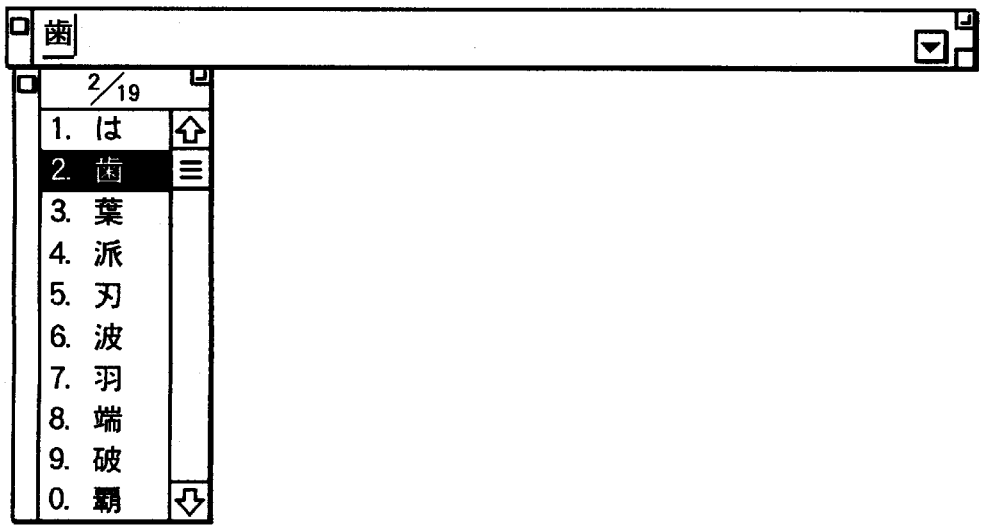
Figure 22C:
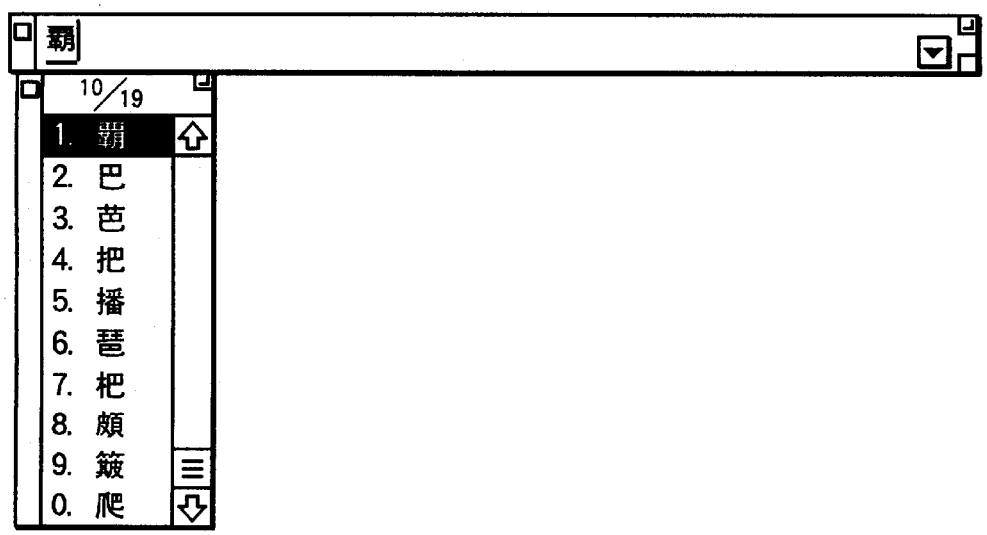

FIG. 20 shows a display example of the third hierarchy menu 53. By placing the cursor on a menu item "." in the second hierarchy menu 52, the third hierarchy menu 53 having the menu item "." at the top is displayed in the right side of the second hierarchy menu 52. If there is an aimed character in the third hierarchy menu 53, the cursor is place on the aimed character and a selection of the character is made. If the aimed character is not found, the cursor is shifted to another menu item having its lower hierarchy menu where the aimed character would be included.

Figures 21A, 21B:
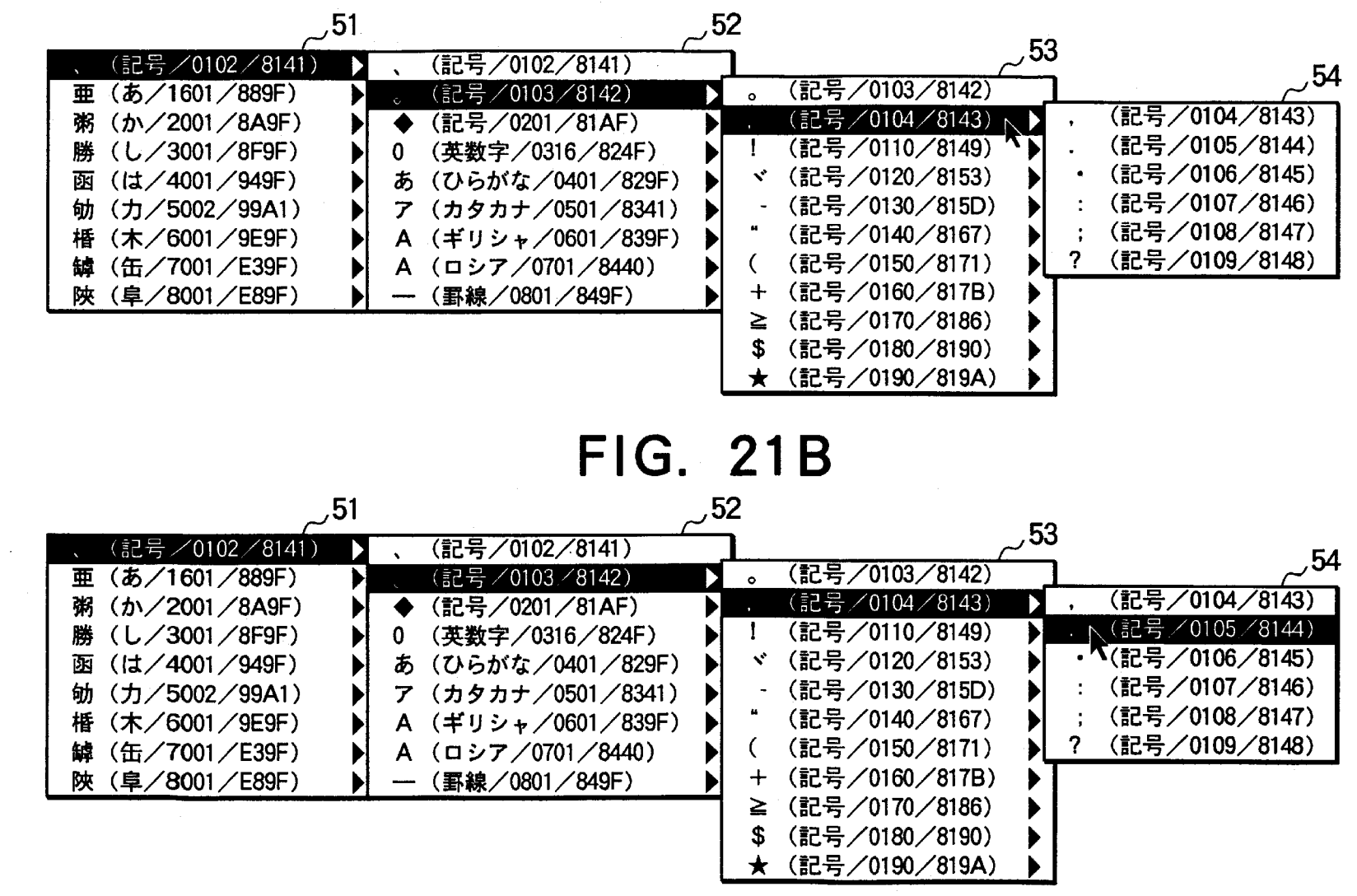

FIG. 21(A) shows a display example of the fourth hierarchy menu 54. By placing the cursor on the menu item ","in the third hierarchy menu 53, the fourth hierarchy menu 54 which is in the JIS code order having "," as the top menu is displayed on the side of the third hierarchy menu 53.

FIG. 21(B) shows the situation where the aimed character is selected since the aimed character is found in the fourth hierarchy menu 54. The selection of the character is made by such operation as releasing the mouse button or by clicking or double-clicking the mouse.

As it is obvious from the above examples, in the present invention, suppose the candidate character for input is ten thousand words and the number of the menu items for each hierarchy menu is ten, the product for the number of candidate item displayed in each hierarchy menu would be "10×10×10×10×10=100000"; which means that to reach the object character, the selecting procedure is made five times at the most from ten thousand candidate words.

As it is indicated in the first to third embodiments of the present invention, it is possible to adopt either kanji (Chinese character), alphabet, or symbols for menu items in the hierarchy menu, and also by preparing plural dictionaries of these items, the dictionaries can be switched depending on the system of the application to be used.

Even if the contents of the dictionaries are different, the dictionaries can be used under the common processing routine such as displaying the menu and selecting the menu item to use for general purpose by defining the dictionaries by predetermined data structures.

Furthermore, although the mouse is used for selecting the menu item in the above embodiments, there is other ways for selecting the menu items. For example, when the menu is displayed, a character is selected by displaying the top item in the reverse contrast image as an initial value, and selecting the item with the upward or downward arrow key, and displaying the lower hierarchy menu by selecting the menu item by a space key and executing the input processing by pressing an execution key.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An input system for characters used in a digital computer having a display unit, comprising:

an input unit having two or less switches for pointing an input object on said display unit;

at least one dictionary storing all candidates of character/characters for input objects, said candidates being arranged in a predetermined order and grouped into a hierarchy structure having a plurality of hierarchy groups in which an upper hierarchy group having upper level candidates each of which is a first candidate of character/characters in a hierarchy group immediately lower than said upper hierarchy groups;

means for displaying a menu consisting of said candidates arranged in said plurality of said hierarchy groups in a hierarchical order from a top hierarchy group to lower hierarchy groups connected by cursor on said display unit; and means for selecting an item of said menu to decide one of said candidates of character/characters for said input object with use of said input unit.

2. An input processing system for characters according to claim 1, wherein in the case where an item of said menu where a cursor is positioned has lower hierarchy groups, said means for displaying menu automatically displays another menu of item list which consists of the first candidates of character/characters in each of said lower hierarchy groups.

3. An input processing system for characters according to claim 1, wherein said means for displaying menu closes the displayed menu when a cursor is positioned outside of a predetermined area in the display screen.

4. An input processing system for characters according to claim 1, wherein plural kinds of dictionaries are provided according to a variety of candidates for an input object of character/characters, and said input processing system having means for selecting one of said dictionaries or changing said dictionaries when receiving instructions through said input unit.

5. An input processing system for characters according to claim 1, wherein said dictionary has a certain data structure that does not depend on the kind of character/characters for input objects; said means for displaying menu is comprised of a processor to carry out displaying menu with an algorithm of program that can be accommodated with different kinds of dictionaries; and said means for selecting the item is comprised of said processor which decides character/characters for input objects by an algorithm of program that can be accommodated with different kinds of said dictionaries.

6. An input processing system for characters according to claim 1, wherein a type of data structure of said dictionary is set to one of several predetermined forms.

7. An input processing system for characters according to claim 6, wherein one of said type of data structure of said dictionary is formed with, according to each menu item which corresponds to said candidate, a set of character/characters code to be input in said processing system and a pointer directed to a group of menu items belonging to a lower hierarchy.

8. An input processing system for characters according to claim 6, wherein one of said type of data structure of said dictionary is formed with a set of display codes for displaying said character/characters as said menu item, codes to input said character/characters when one of said menu items is selected, and a pointer directed to a menu item group of the lower hierarchy of said menu item.

9. An input processing system for characters according to claim 1, wherein said means for displaying menu further displays auxiliary information on selecting said menu item or information about attribute of said menu item for each menu displayed.

10. An input processing system for characters according to claim 1, wherein said input unit is a pointing device with at least one button attached; said means for displaying menu displays a hierarchical menu according to a cursor position in a pressing condition of said button of said input unit; and when said pressing condition of said button is released, said means for selecting an item executes input character/characters of the menu item where the cursor is positioned.

* * * * *